(12) United States Patent
Seidel et al.

(10) Patent No.: US 10,589,798 B2
(45) Date of Patent: Mar. 17, 2020

(54) AIR CONDUCTION ELEMENT FOR REDUCING AIR RESISTANCE OF A LOAD-CARRYING VEHICLE

(71) Applicant: JOST-WERKE DEUTSCHLAND GMBH, Neu-Isenburg (DE)

(72) Inventors: Günter Seidel, Riedstadt (DE); José Manuel Algüera, Aschaffenburg (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 71 days.

(21) Appl. No.: 15/576,000

(22) PCT Filed: Jun. 8, 2016

(86) PCT No.: PCT/EP2016/063044
§ 371 (c)(1),
(2) Date: Nov. 21, 2017

(87) PCT Pub. No.: WO2016/198456
PCT Pub. Date: Dec. 15, 2016

(65) Prior Publication Data
US 2018/0154950 A1    Jun. 7, 2018

(30) Foreign Application Priority Data
Jun. 9, 2015    (DE) .......................... 10 2015 210 502

(51) Int. Cl.
B62D 35/00    (2006.01)
(52) U.S. Cl.
CPC .................... *B62D 35/001* (2013.01)
(58) Field of Classification Search
CPC ................ B62D 35/001; B62D 35/007
(Continued)

(56) References Cited

U.S. PATENT DOCUMENTS 3,960,402 A * 6/1976 Keck .................... B62D 35/001
296/180.4
4,320,920 A    3/1982 Goudey
(Continued)

FOREIGN PATENT DOCUMENTS

CN        102241259 A    11/2011
DE           2922130 A1    12/1980
(Continued)

*Primary Examiner* — Jason S Morrow
*Assistant Examiner* — E Turner Hicks
(74) *Attorney, Agent, or Firm* — Hudak, Shunk & Farine Co. LPA

(57) ABSTRACT

An air conduction element for reducing the air resistance of a load-carrying vehicle having a load space structure. The air conduction element can be externally mounted in the rear region of the load space structure and includes an air conduction duct with a front air inlet opening and a rear air outlet opening, front and rear being in relation to the direction of travel (x). The air inlet opening overlaps the load space structure in the direction of travel (x) and the air outlet opening is arranged behind the load space structure within the cross-sectional contour thereof. The air conduction element has a cover which delimits the air conduction duct and which is arranged movably relative to the load space structure. The cap slowly drops in the direction of the load space structure when the air speed drops below a defined value and is raised by the air current in relation to the load space structure when the air speed exceeds a defined value. It is therefore the aim to devise an air conduction element with which the maximum vehicle dimensions defined for the travel position of the air conduction element are maintained also during adjustment thereof. For this purpose, the cover is mounted in relation to the load space structure such that it can carry out a translatory movement only.

19 Claims, 3 Drawing Sheets

(58) Field of Classification Search
USPC .................. 296/180.4, 180.1, 181.5, 208
See application file for complete search history.

(56) References Cited

U.S. PATENT DOCUMENTS

| | | | | |
|---|---|---|---|---|
| 5,171,057 | A * | 12/1992 | Sharp | B60S 1/56 |
| | | | | 296/180.4 |
| 5,375,903 | A * | 12/1994 | Lechner | B62D 35/001 |
| | | | | 296/180.1 |
| 5,842,734 | A * | 12/1998 | Lechner | B62D 35/001 |
| | | | | 296/180.1 |
| 6,779,834 | B1 | 8/2004 | Keller | |
| 7,712,821 | B2 * | 5/2010 | Moscoso Gomez | |
| | | | | B62D 35/001 |
| | | | | 296/180.1 |
| 7,765,044 | B2 * | 7/2010 | Neuburger | G01C 21/26 |
| | | | | 296/180.1 |
| 7,862,102 | B1 | 1/2011 | Benton | |
| 7,950,720 | B2 * | 5/2011 | Skopic | B62D 35/001 |
| | | | | 105/1.3 |
| 8,196,996 | B1 * | 6/2012 | Campbell | B62D 35/001 |
| | | | | 296/180.4 |
| 8,205,932 | B1 * | 6/2012 | Houk | B62D 35/001 |
| | | | | 296/180.4 |
| 8,360,509 | B2 | 1/2013 | Smith et al. | |
| 9,493,196 | B2 * | 11/2016 | Camosy | B62D 35/001 |
| 2007/0001481 | A1 | 1/2007 | Breidenbach | |
| 2008/0093886 | A1 * | 4/2008 | Nusbaum | B62D 35/001 |
| | | | | 296/180.1 |
| 2010/0201153 | A1 | 8/2010 | Pesotini, Jr. | |
| 2011/0068603 | A1 | 3/2011 | Domo et al. | |
| 2013/0076064 | A1 | 3/2013 | Smith et al. | |

FOREIGN PATENT DOCUMENTS

| | | |
|---|---|---|
| EP | 1860023 A2 | 11/2007 |
| WO | 2006060852 A1 | 6/2006 |

* cited by examiner

AIR CONDUCTION ELEMENT FOR REDUCING AIR RESISTANCE OF A LOAD-CARRYING VEHICLE

FIELD OF THE INVENTION

The invention concerns an air conduction element for reducing the air resistance of a load-carrying vehicle having a cargo space structure, which can be externally mounted in the rear region of the cargo space structure and comprises an air conduction duct with a front air inlet opening and a rear air outlet opening in the direction of travel, wherein the air inlet opening overlaps the cargo space structure in the direction of travel and the air outlet opening is arranged behind the cargo space structure within its cross section contour, wherein the air conduction element comprises a cover which delimits the air conduction duct and which is arranged movably relative to the cargo space structure, which drops when the air speed falls below a defined value in the direction of the cargo space structure and which is lifted upon exceeding the air speed of the air flow relative to the cargo space structure.

BACKGROUND OF THE INVENTION

By a load-carrying vehicle is meant in particular trucks and their trailers, as well as buses. The load-carrying vehicle always has a cargo space structure, which contains the goods or persons intended for the transport. The cargo space structure is bounded by fully or partly enclosed side walls and a roof wall. During rapid forward travel of the load-carrying vehicle, a negative pressure arises in the region behind the cargo space structure, resulting in a suction effect and increasing the fuel consumption of the load-carrying vehicle.

In the prior art there have been many attempts to lengthen the contour of the tail by means of a cone formed on it, so that the air flowing across the cargo space structure lies against the cone and thereby reduces the suction effect. Thus, US 2011/0068603 A1 proposes placing a tubular bulge at the rear of the load-carrying vehicle, which almost entirely surrounds the contour of the cargo space structure in the circumferential direction.

U.S. Pat. No. 8,360,509 B2, on the other hand, discloses the use of foldable wall elements in place of a tubular bulge, while US 2007/0001481 A1 proposes an enclosed cone which is telescopic in the axial direction.

What all these devices have in common is that the air conducting surfaces forming the cone are arranged solely behind the cargo space structure so as not to further increase the coefficient of air resistance.

The major drawback of these rear-side air conducting surfaces is that the cargo space structure can only be unloaded with major expense, since its rear doors can only be opened after a prior disassembly of the air conducting surfaces. Furthermore, on account of the rear-side mounting of the air conducting surfaces, the permissible vehicle length is significantly exceeded, so that it is necessary to shorten the effectively usable cargo space structure.

EP 1 860 023 A2 proposes taking up the air flow across the cargo space structure during travel by means of a rigid-shape, tubular structure and channeling it to the negative pressure region located behind the tail. However, the tubular structure has proven to be a drawback, since it results in greater height of the vehicle, which may result in contact with the roof of the cargo terminal during maneuvering at roofed cargo terminals and corresponding damage to both the roof and the tubular structure. The height of the tubular structure cannot be seen from the driver's cabin on account of being mounted at the rear and at the top side of the cargo space structure and therefore it is difficult to estimate it.

Based on these problems, U.S. Pat. No. 7,862,102 B1 discloses a device for reducing the air resistance in which extensible air conduction elements are arranged at the rear of a cargo space structure, which are swiveled by a rotational movement from a starting retracted position to an extended travel position. However, it has found to be a drawback that the dimensions of the load-carrying vehicle are increased during the execution of the rotational movement beyond the level in the starting and travel position, which leads to problems with the legal regulations and furthermore increases the risk of collision with bridges and other road users during the swiveling movement of the air conduction elements.

For this reason, the problem which is invention proposes to solve was to develop an air conduction element with which the maximum vehicle dimensions defined by its travel position are also maintained during the adjustment.

SUMMARY OF THE INVENTION

The problem is solved according to the invention with an air conduction element having a cover mounted in relation to the cargo space structure such that it can carry out only a translatory movement. The cross section of the air conduction duct is changed thanks to the translatory movement of the cover.

During a translatory movement of the cover, all points of the cover experience the same displacement. At a given time, velocities and accelerations of all points are identical. They move on parallel trajectories. This should be distinguished from rotation during which all points of the system or body move about a common axis.

By a movable arrangement of the cover with respect to the cargo space structure is meant a mounting making possible in particular a blowing out of the cover relatively to the closest wall of the cargo space structure such that the air conduction duct has an increased clear cross section in this extended position. The lowering or the position of the cover spaced apart from the cargo space structure occurs preferably entirely by means of the air flow sweeping over the load-carrying vehicle so that no further subassemblies or control units are needed. Since the air resistance is negligible in any case during maneuvering, the air conduction element can remain in the lowered position during slow driving and thus requires slight structural room. With faster driving, the influence of the air conduction element increases, but then there are few obstacles reaching into the roadway space.

The air conduction element according to the invention is fastened especially preferably to a roof wall of the cargo space structure, wherein the air resistance can be further decreased when the other walls of the cargo space structure, such as the side walls, are also provided with corresponding air conduction elements. Prestressed spring elements may be provided for a retracting of the air conduction elements arranged at the side of the cargo space structure. The air conduction element secured to the roof wall returns to its lowered starting position by the force of gravity when the air flow abates.

The cover terminates in the vehicle longitudinal direction above the rear end of the cargo space structure or goes beyond it.

The air conduction duct of the air conduction element is preferably substantially closed in the circumferential direction and in any case has small-area openings for pressure relief, only partly penetrating the cover or any side walls which are present in the direction of travel.

Advantageously, the cover is designed as an integral and rigid-shape hood. By a rigid-shape hood is meant a cover which is always the same shape regardless of the air flow, and which is furthermore designed as an integral single-piece structural unit.

Advisedly, the cover is held on the cargo space structure by means of articulated connection elements. The connection elements restrict the lifting of the cover above the predetermined air speed, for which purpose they may engage with the cover as well as the cargo space structure and should be variably dimensioned in the direction of movement of the cover so that a complete lowering and raising of the cover is possible.

Preferably, the cover is connected each time at the side by means of a flexible side wall to the cargo space structure. By a flexible side wall is meant an elastic, rollable or foldable side wall. Especially preferably the flexible side walls are joined tightly to the cargo space structure along their entire length.

Preferably, first side walls are arranged at the side on the rigid-shape hood in the direction of the cargo space structure, overlapping with second side walls which protrude relative to the cargo space structure. In this way, rigid-shape and robust side walls are produced, making possible an approximately half-way reduction of the structural height each time for the same height below the predetermined air speed. The flexible side walls as well as the overlapping first and second side walls enable a maximum cross section of the air conduction duct and thereby decrease pressure losses in the lateral direction.

The connection elements can be integrated in the first and second side wall. This produces the advantage that no connection elements or other installed parts are needed inside the air conduction duct, such as would result in a throttling of the air flowing through the air conduction duct.

It has been found to be advantageous for each conduction element to comprise a guide cam and a guide contour, wherein the guide cam is formed on the first or second side wall and interacts with the guide contour formed in the other respective side walls.

The guide contour may be a groove, a rail, or a corresponding extended recess in which the cam engages in displaceable manner.

In another alternative embodiment it is provided that the connection elements are formed from at least two swivel arms staggered in the direction of travel which are rotary mounted in fixed location on the cover and the cargo space structure, whose bearing axis each time is oriented transversely to the direction of travel. In this case, the erecting of the cover occurs about a fixed pivot in the area of the cargo space structure, the cover being always oriented parallel to the adjacent wall of the cargo space structure. This configuration makes possible a sideways guidance of the cover, provided that the bearing axes of the swivel arms are oriented transversely to the direction of travel, which is especially advantageous for the side wall.

The connection elements may also comprise at least one first and second joint, staggered relative to each other, whose bearing axes are arranged horizontally staggered by 90° relative to each other. With this arrangement of joints, the attachment of a swivel arm is unnecessary. Preferably, one of the bearing axes lies in the direction of travel and one is parallel to the direction of travel.

It is likewise possible for the first and/or second joint to be a hinge with an upper and a lower leg, rotationally joined to each other, wherein the upper leg is secured to the cover and the lower leg to the cargo space structure. The hinge has a comparatively small structural space with low weight.

Favorably, an apron extending as far as the air outlet opening is fastened to the cover. The apron lengthens the air conduction duct especially up to the region situated behind the cargo space structure opposite the direction of travel. For this, the apron forms a bend relative to the substantially longitudinally extending air conduction duct, by which the air flow arrives in the region behind the cargo space structure and having a negative pressure during the travel. The apron is mounted by its first ends permanently on the cover and spans the air outlet opening with its opposite second end.

The apron may furthermore be secured to the side walls and thereby prevent a pressure drop inside the air conduction duct in front of the air outlet opening. Thus, the air conduction duct is defined by the cover as well as the apron and possibly by the side walls.

Insofar as the apron is made from a rigid-shape material, the air outlet opening migrates up and down in the vertical direction together with the cover. For this, it is advisable to secure the apron to the cargo space structure by means of a guide in the direction of movement.

Alternatively, it may also be provided to make the apron from a flexible fabric. By a flexible fabric is meant a textile or a film which collapses in the unloaded state. In this embodiment, the movement of the cover is decoupled from the air outlet opening, so that it constantly remains in fixed position behind the cargo space structure. During slow driving or standstill of the load-carrying vehicle, the apron made of the flexible fabric folds together.

According to one especially advantageous embodiment, elastic clasps are arranged in the air inlet opening, extending from the cover to the cargo space structure. In this way, even at comparatively slow travel of the load-carrying vehicle, there is already a favorable filling of the air conduction duct by the air flow and thus an assisted lifting of the cover.

Advisedly, the cover has an especially rigid lift flap in the region of the air inlet opening. The lift cover constitutes a first option for lifting the cover with respect to the cargo space structure. The lift flap can be positioned upward at a slant in the direction of travel of the load-carrying vehicle.

Preferably the cover is formed with an airfoil. This second option of producing a lifting of the cover with respect to the cargo space structure can also be combined with the first option of a lift flap. By an airfoil is meant in fluid dynamics the shape of the cross section of a body in the direction of flow. Forces acting on this body are created by the specific shape and the flow of a liquid or gas around the body. An airfoil is especially suitable for creating dynamic lift during slight flow resistance.

The airfoil may be formed by the rigid-shape hood itself, wherein this should be made advantageously of a foamed body or a molded plastic part. A cover made from a rigid-shape hood has an especially effective airfoil, making possible a lifting of the cover even with a partially turbulent oncoming flow. Even under the strong influence of an atmospheric wind of variable force and direction, the rigid-shape hood creates sufficient lift for the air conduction duct to be opened.

Advantageously, the air conduction duct has a conically tapering section starting from the air inlet opening in the direction of the air outlet opening.

In this way, in addition to the lift effect of the cover a back pressure is advantageously built up inside the air conduction duct and accomplishes a maximum internal cross section for it.

Advantageously, the air conduction duct has a variable cross section in dependence on the position of the cover. At standstill or during slow driving of the load-carrying vehicle, the air conduction duct has its smallest cross section, and it may be entirely closed in the case of a cover with flexible side walls attached to it. The cover then lies entirely on the cargo space structure or clings to it.

BRIEF DESCRIPTION OF THE DRAWINGS

For better understanding, the invention shall be explained more closely below with the aid of seven figures. There are shown.

DETAILED DESCRIPTION OF THE INVENTION

Figure 1:
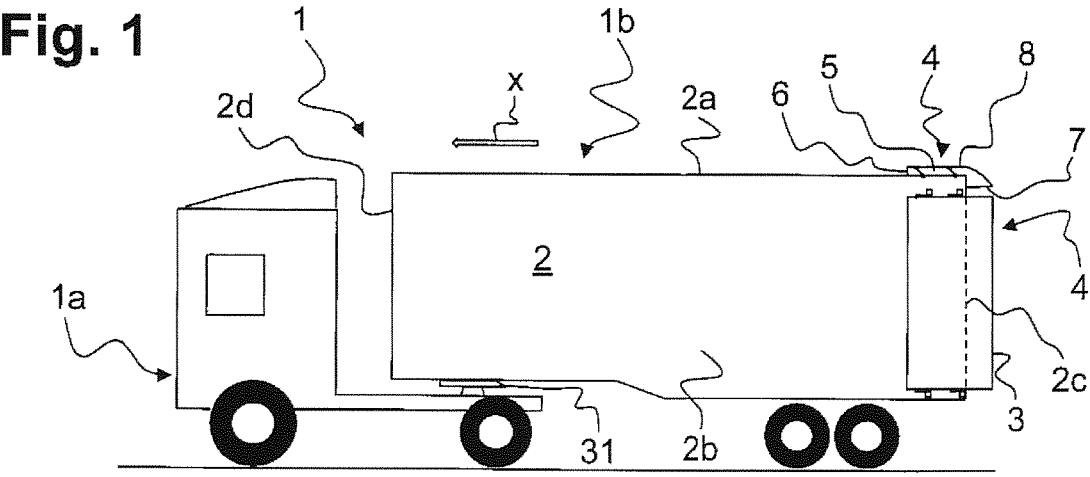
FIG. 1: a side view of a load-carrying vehicle with several air conduction elements arranged in the rear region of a load-carrying vehicle.

FIG. 1 shows a side view of a load-carrying vehicle 1 consisting of a tractor unit 1a and a semitrailer 1b releasably attached to it by means of a fifth wheel coupling 31. The semitrailer 1b comprises a cargo space structure 2, in which goods can be transported protected against external factors.

The cargo space structure 2 is formed by a roof wall 2a, two opposite side walls 2b extending in the direction of travel x, a front wall 2d bounding off the cargo space structure 2 from the tractor unit 1a in the direction of travel x and a rear wall 2c. In particular, the rear wall 2c can be provided with swiveling doors (not shown) for loading and unloading.

In the rear region 3 of the cargo space structure 2 are located one air conduction element 4 each on the roof wall 2a and on the side walls 2b. Each of the three air conduction elements 4 has an air conduction duct 5 oriented in the direction of travel x with an air inlet opening 6 located in the direction of travel x and an air outlet opening 7 situated at the opposite end. The air outlet opening 7 should be formed with a larger cross section as compared to the air conduction duct 5 and also the air inlet opening 6. This accomplishes a diffuser effect with a decreased speed of the air flowing through the air conduction element 4 while at the same time increasing its pressure. The air outlet opening 7 furthermore lies inside the cross section contour of the cargo space structure 2 and thus in a region in which a negative pressure is formed during driving operation. The orientation of the air outlet opening 7 lies basically in the same plane as the direction of travel x.

The air conduction elements 4 in the representation of FIG. 1 are in a raised position with respect to the cargo space structure 2, that is, during fast driving of the load-carrying vehicle 1.

Figure 2:
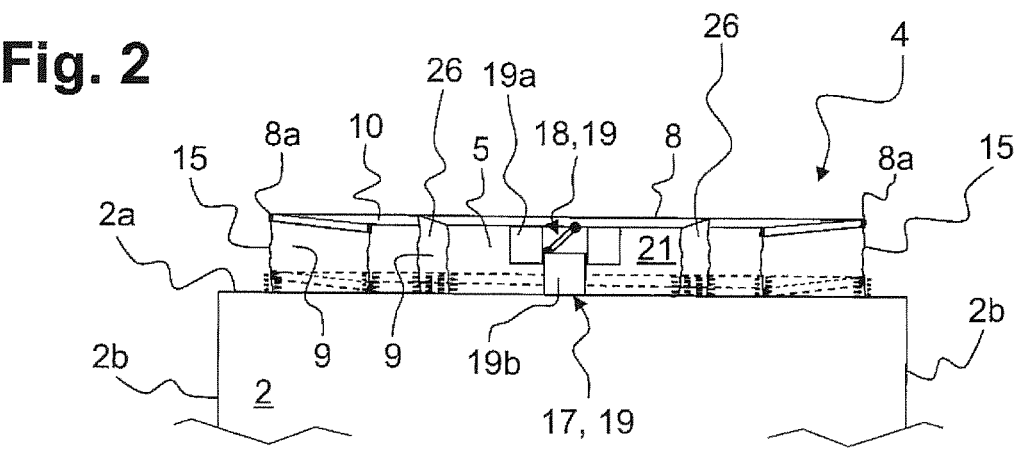
FIG. 2: a front view of an air conduction element according to a first embodiment.
Figure 3:
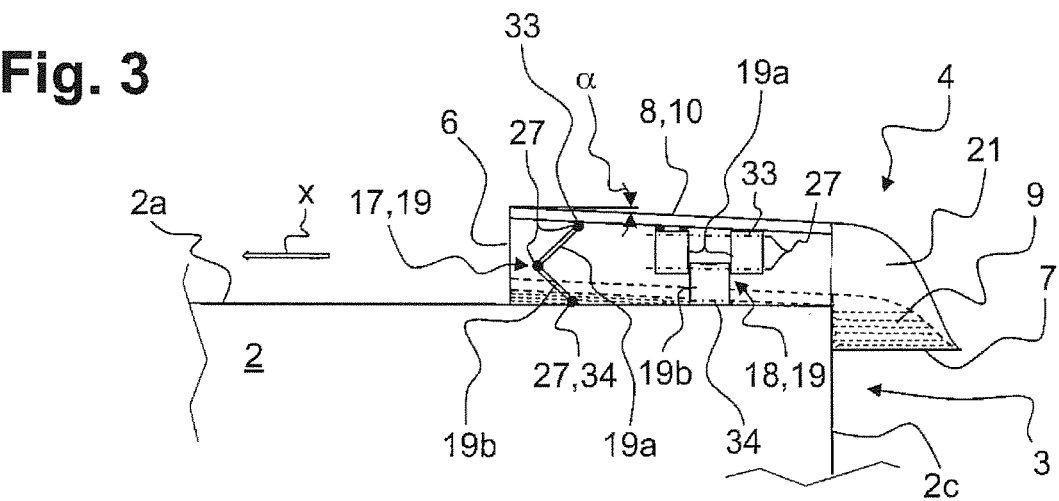
FIG. 3: a longitudinal section through the air conduction element according to FIG. 2 in raised and lowered position.

In the representations of FIG. 2 and FIG. 3, the air conduction element 4 is likewise in a raised position with respect to the cargo space structure 2. A position lowered onto the cargo space structure 2 is indicated each time by broken lines.

FIG. 2 shows in a front view an air conduction element 4 according to a first embodiment, which is arranged for example on the roof wall 2a of a cargo space structure 2. In the same way, the air conduction element 4 could also be arranged on the side walls 2b and be adjustable relative to them.

The air conduction element 4 comprises a cover 8, which is fashioned as a rigid-shape hood 10. The rigid-shape hood 10 is a flat plate, whose lateral end sections 8a are bent at 90° in the direction of the cargo space structure 2. On both lateral end sections 8a of the rigid-shape hood 10 there are arranged flexible side walls 15 along the entire axial extension of the air conduction element 4, reaching down to the roof wall 2a and being secured to the latter for their entire length. The roof wall 2a, the flexible side walls 15 and the cover 8, together with an apron 21 fastened to the cover 8 and the flexible side walls 15, subtend an air conduction duct 5 which passes through the air conduction element 4 from the air inlet opening 6 to the air outlet opening 7.

The cover 8 can move solely in translatory movement via two connection elements 16 arranged one behind the other in the direction of travel x, independently of its raised or lowered position with respect to the roof wall 2a. The connection elements 16 consist of a first joint 17 situated in the direction of travel x and a second joint 18 located behind it. The two joints 17, 18 are fashioned as hinges 19 and have an upper leg 19a and a lower leg 19b, which are secured to each other and able to rotate about a bearing axis 27.

Each of the upper legs 19a engages by means of a cover pivot bearing 33 with the cover 8 and each of the lower legs 19b engages by means of a cargo space structure pivot bearing 34 with the cargo space structure 2. The bearing axes 27 of the first joint 17 and the bearing axes 27 of the second joint 18 are basically perpendicular to each other. In the representation of FIGS. 2 and 3, the bearing axes 27 of the first joint 17 extend transversely to the direction of travel x and the bearing axes 27 of the second joint 18 are parallel to the direction of travel x.

The first and second joint 17, 18 are both arranged centrally inside the air conduction duct 5. It is likewise possible to provide a first joint 17 at both lateral end sections 8a and a second joint 18 each time behind them, opposite the direction of travel x, engaging with the cover 8 from the outside.

In the air conduction duct 5, furthermore, there are ribs 26 between the flexible side walls 15, which likewise run across the axial extension of the cover 8. The ribs 26, like the flexible side walls 15, consist of a flexible fabric 9 and thereby enable a vertical movement of the cover 8 between a lowered and a raised position.

The difference in level of the air conduction duct 5 between the air inlet opening 6 and the air outlet opening 7 is bridged by means of the apron 21, which is arranged on the cover 8 and both flexible side walls 15. The apron 21 also is made of a flexible fabric 9 and thereby allows a vertical movement of the cover 8.

The cover 8 is inclined with respect to the roof wall 2a by the angle a and stands upward in the direction of travel x, so that with increasing speed of travel a lift is at first generated on the cover 8 and moreover because of the conically tapering air conduction duct 5 a back pressure is formed in the latter, which holds the cover 8 in the raised position.

Figure 4:
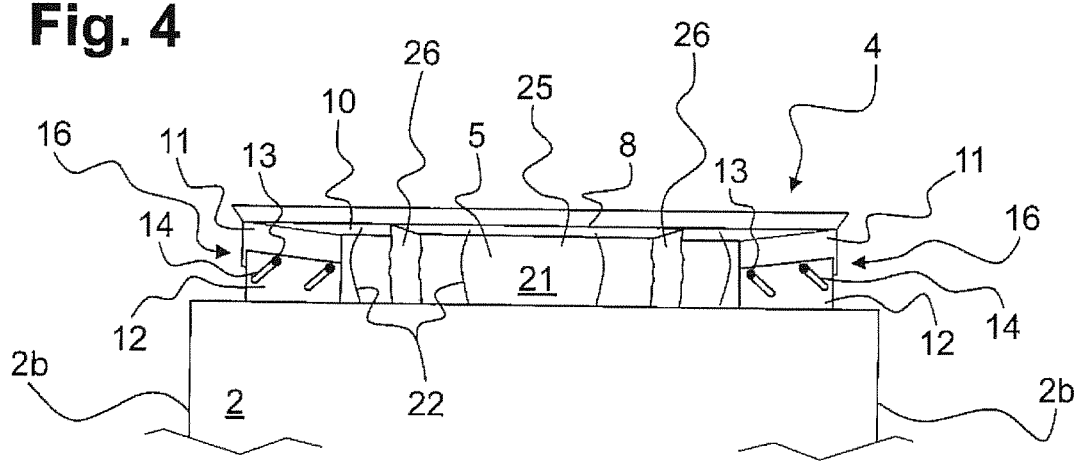
FIG. 4: a front view of the air conduction element according to a second embodiment.
Figure 5:
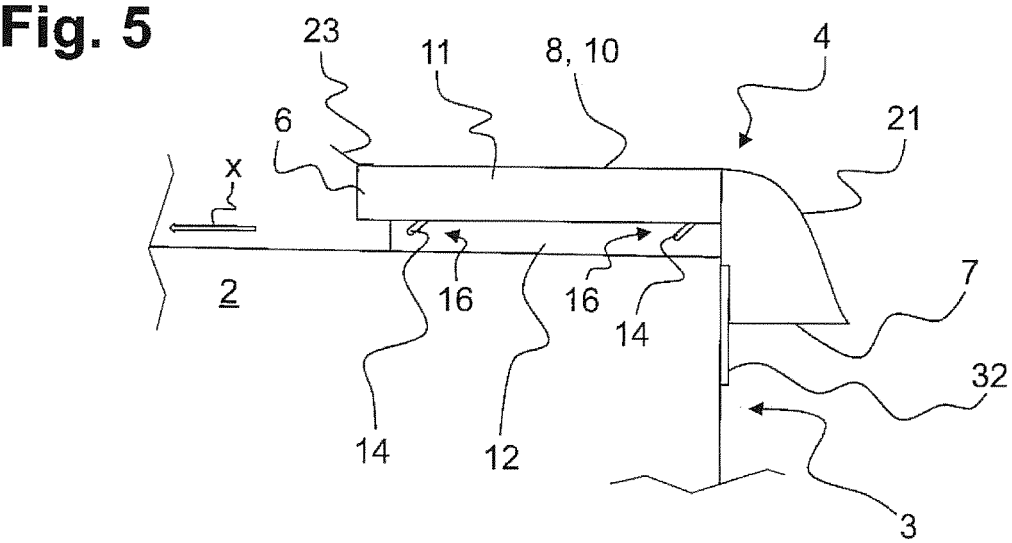
FIG. 5: a side view of the air conduction element according to FIG. 4.

FIG. 4 and FIG. 5 show a second, alternative embodiment, in which the cover 8 is likewise configured as a rigid-shape hood 10. Instead of flexible side walls 15, however, stationary first side walls 11 engaging with the cover 8 are provided, projecting in shape-stable manner from the cover 8 in the direction of the cargo space structure 2 and overlapping second side walls 12 at least partly. The second side walls 12 are secured stationary to the cargo space structure 2, especially to the roof wall 2a.

In the first and second side walls 11, 12 are integrated connection elements 16 for the forced guidance of the cover 8 between a lowered and a raised position. According to FIGS. 4 and 5, guide contours 14 are formed in the second side walls 12, for example in the form of oblong slots. The first side walls 11 have guide cams 13, which reach in or through the guide contours 14, so that the cover 8 can follow the trend of the guide contours 14. In the same way and without sacrificing function, the guide cams 13 could be provided at the second side walls 12 and the guide contours 14 at the first side walls 11.

The rigid-shape hood 10 is fashioned as a flat plate and oriented parallel to the roof wall 2a. Accordingly, the rigid-shape hood 10 as such generates no lift. In the region of the air inlet opening 6, the rigid-shape hood 10 has a lift flap 23 directed away from the cargo space structure 2 in the direction of travel x, which initiates a raising of the rigid-shape hood 10 in an oncoming flow.

The raising of the cover 8 can furthermore be assisted by elastic clasps 22 running through the cargo space structure 2, regardless of its embodiment or the connection elements 16 used. These bend reversibly when the cover 8 is lowered and expand during a following upward movement of the cover 8.

The apron 21 can be formed as a flexible fabric 9 or, as represented in FIG. 5, from a rigid-shape material. For the latter embodiment, however, it is advantageous for the apron 21 to be secured to the cover 8 and the first side walls 11 and additionally to be held on the cargo space structure 2 by means of a linear guide 32 in the direction of movement. In this embodiment, the air outlet opening 7 moves to the same degree as the cover 8.

Figure 6:
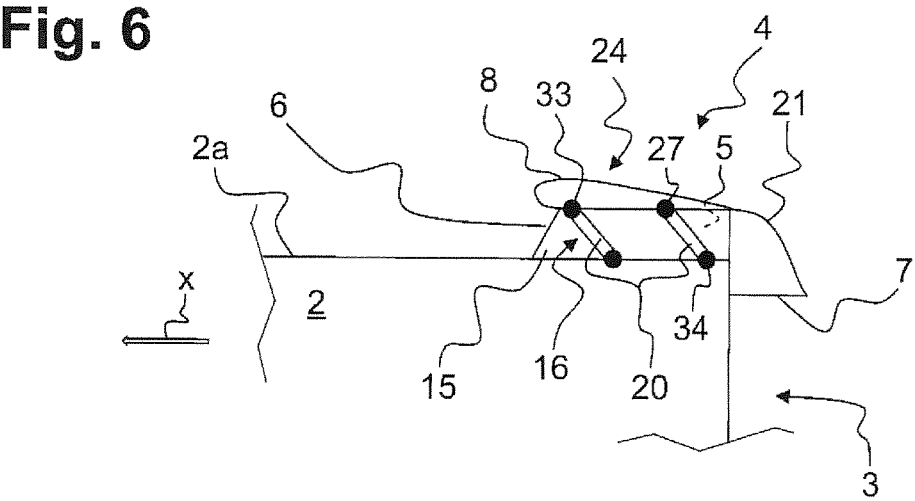
FIG. 6: a side view of the air conduction element according to a third embodiment

FIG. 6 shows a third embodiment of the air conduction element 4, in which the cover 8 is formed as a rigid airfoil 24. The cover 8 is articulated by means of several connection elements 16 in the form of swivel arms 20 to the cargo space structure 2, with preferably two swivel arms 20 engaging on each side of the cover 8. Each swivel arm 20 has a cover pivot bearing 33 and a cargo space structure pivot bearing 34, whose bearing axes 27 are each oriented transversely to the direction of travel x. The cover pivot bearing 33 is always situated in front of the cargo space structure pivot bearing 34 in the direction of travel x. Upon passing a given threshold value of the air speed, the cover 8 swivels about the cargo space structure pivot bearing 34 into the raised position and thereby subtends the air conduction duct 5.

In the lowered position of the cover 8, the underside of the airfoil 24 lies fully against the roof wall 2a of the cargo space structure 2.

On both sides of the air conduction duct 5, flexible side walls 15 extend from the cover 8 to the cargo space structure 2 so that the air conduction duct 5 regardless of the position of the cover 8 is always bounded at the sides by the flexible side walls 15.

Figure 7:
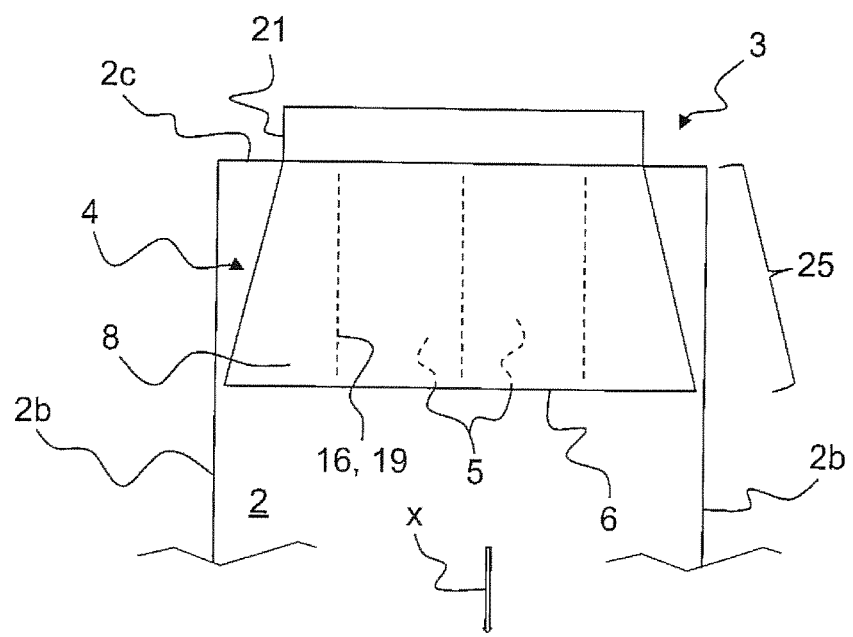
FIG. 7: a top view of an air conduction element according to FIGS. 1 to 6.

FIG. 7 shows an air conduction element 4 regardless of its embodiment in top view, wherein the cover 8 has a conically tapering section 25 opposite the direction of travel x. This serves to build up a back pressure beneath the cover 8 and thereby assist the raising of the cover 8.

LIST OF REFERENCE SYMBOLS

1 Load-carrying vehicle
1a Tractor unit
1b Semitrailer
2 Cargo space structure
2a Roof wall
2b Side wall
2c Rear wall
2d Front wall
3 Rear region of cargo space structure
4 Air conduction element
5 Air conduction duct
6 Air inlet opening
7 Air outlet opening
8 Cover
8a Lateral end section
9 Flexible fabric
10 Rigid-shape hood
11 First side wall
12 Second side wall
13 Guide cam
14 Guide contour
15 Flexible side wall
16 Connection element
17 First joint
18 Second joint
19 Hinge
19a Upper leg
19b Lower leg
20 Swivel arm
21 Apron
22 Elastic clasps
23 Lift flap
24 Airfoil
25 Conical section
26 Rib
27 Bearing axis
31 Fifth wheel coupling
32 Linear apron guide
33 Cover pivot bearing
34 Cargo space structure pivot bearing
α Cover/roof wall angle
x Direction of travel

What is claimed is:

1. An air conduction element for reducing the air resistance of a load-carrying vehicle having a cargo space structure, which is externally mounted in the rear region of the cargo space structure and comprises an air conduction duct with a front air inlet opening and a rear air outlet opening in a direction of travel (x), wherein the air inlet opening overlaps the cargo space structure in the direction of travel (x) and the air outlet opening is arranged behind the cargo space structure within its cross section contour, wherein the air conduction element comprises a cover which delimits the air conduction duct and which is arranged movably relative to the cargo space structure, which drops when the air speed falls below a defined value in the direction of the cargo space structure and which is lifted upon exceeding the air speed of the air flow relative to the cargo space structure, wherein the cover is mounted in relation to the cargo space structure such that it can carry out only a translatory movement and not any rotational movement, and wherein the cover is joined at a side to the cargo space structure by a flexible side wall each time.

2. The air conduction element as claimed in claim 1, wherein the cover is formed as an integral, rigid-shape hood.

3. The air conduction element as claimed in claim 1, wherein the cover is held on the cargo space structure by articulated connection elements.

4. An air conduction element for reducing the air resistance of a load-carrying vehicle having a cargo space structure, which is externally mounted in the rear region of the cargo space structure and comprises an air conduction duct with a front air inlet opening and a rear air outlet opening in a direction of travel (x), wherein the air inlet opening overlaps the cargo space structure in the direction of travel (x) and the air outlet opening is arranged behind the cargo space structure within its cross section contour, wherein the air conduction element comprises a cover which delimits the air conduction duct and which is arranged movably relative to the cargo space structure, which drops when the air speed falls below a defined value in the direction of the cargo space structure and which is lifted upon exceeding the air speed of the air flow relative to the cargo space structure, wherein the cover is mounted in relation to the cargo space structure such that it can carry out only a translatory movement and not any rotational movement, wherein the cover is formed as an integral, rigid-shape hood, and wherein first side walls are arranged on the rigid-shape hood at the side oriented in the direction of the cargo space structure, and overlapping with second side walls protruding with respect to the cargo space structure.

5. The air conduction element as claimed in claim 4, wherein the connection elements are integrated in the first and second side wall.

6. The air conduction element as claimed in claim 5, wherein each connection element comprises a guide cam and a guide contour, wherein the guide cam is formed on the first or second side wall and interacts with the guide contour formed in the other respective side wall.

7. The air conduction element as claimed in claim 3, wherein the connection elements are formed from at least two swivel arms staggered in the direction of travel which are rotary mounted in fixed location on the cover and the cargo space structure, whose bearing axis each time is oriented transversely to the direction of travel (x).

8. An air conduction element for reducing the air resistance of a load-carrying vehicle having a cargo space structure, which is externally mounted in the rear region of the cargo space structure and comprises an air conduction duct with a front air inlet opening and a rear air outlet opening in a direction of travel (x), wherein the air inlet opening overlaps the cargo space structure in the direction of travel (x) and the air outlet opening is arranged behind the cargo space structure within its cross section contour, wherein the air conduction element comprises a cover which delimits the air conduction duct and which is arranged movably relative to the cargo space structure, which drops when the air speed falls below a defined value in the direction of the cargo space structure and which is lifted upon exceeding the air speed of the air flow relative to the cargo space structure, wherein the cover is mounted in relation to the cargo space structure such that it can carry out only a translatory movement and not any rotational movement, wherein the cover is held on the cargo space structure by articulated connection elements, and wherein the connection elements comprise at least one first and second joint, oriented relative to each other, whose bearing axes are arranged horizontally displaced by 90° relative to each other.

9. The air conduction element as claimed in claim 8, wherein at least one of the first and the second joint is a hinge with an upper and a lower leg, rotationally joined to each other, wherein the upper leg engages with the cover and the lower leg with the cargo space structure.

10. The air conduction element as claimed in claim 1, wherein an apron is secured on the cover extending as far as the air outlet opening.

11. The air conduction element as claimed in claim 10, wherein the apron is fastened to side walls of the cover.

12. The air conduction element as claimed in claim 10, wherein the apron is made from a rigid-shape material.

13. The air conduction element as claimed in claim 10, wherein the apron is made from a flexible fabric.

14. The air conduction element as claimed in claim 1, wherein elastic clasps are arranged in the air inlet opening, bracing the cover with respect to the cargo space structure.

15. The air conduction element as claimed in claim 1, wherein the cover comprises a lift flap in the area of the air inlet opening.

16. The air conduction element as claimed in claim 15, wherein the lift flap is positioned upward at a slant in the direction of travel (x) of the load-carrying vehicle.

17. The air conduction element as claimed in claim 1, wherein the cover is formed with an airfoil.

18. The air conduction element as claimed in claim 17, wherein the cover is formed as an integral, rigid-shape hood, wherein the airfoil is formed by the rigid-shape hood.

19. The air conduction element as claimed in claim 1, wherein the air conduction duct has a conically tapering section starting at the air inlet opening in the direction of the air outlet opening.

* * * * *